United States Patent
Hendriks et al.

(10) Patent No.: US 7,637,663 B2
(45) Date of Patent: Dec. 29, 2009

(54) FLUID BEARING WITH A VARIABLE DEPTH GROOVE

(75) Inventors: Ferdinand Hendriks, Morgan Hill, CA (US); Brian H. Thornton, Mountain View, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 337 days.

(21) Appl. No.: 11/454,708

(22) Filed: Jun. 15, 2006

(65) Prior Publication Data
US 2007/0292058 A1    Dec. 20, 2007

(51) Int. Cl.
*F16C 32/06* (2006.01)
(52) U.S. Cl. .................. 384/107; 384/112; 384/123
(58) Field of Classification Search .............. 384/100, 384/107, 111, 112, 114, 115, 120, 121, 123
See application file for complete search history.

(56) References Cited

U.S. PATENT DOCUMENTS

| | | | | |
|---|---|---|---|---|
| 3,484,143 | A | * | 12/1969 | Tallian et al. ............... 384/108 |
| 5,973,878 | A | * | 10/1999 | Yoshida et al. ............ 360/98.07 |
| 6,082,900 | A | * | 7/2000 | Takeuchi et al. ............. 384/115 |
| 6,176,618 | B1 | | 1/2001 | Kawawada et al. |
| 6,200,035 | B1 | * | 3/2001 | Otsuki ........................ 384/123 |
| 6,276,831 | B1 | * | 8/2001 | Takahashi et al. ........... 384/100 |
| 6,316,857 | B1 | | 11/2001 | Jeong |
| 6,417,590 | B1 | | 7/2002 | Komura et al. |
| 6,428,211 | B1 | * | 8/2002 | Murabe et al. ............... 384/114 |
| 6,900,567 | B2 | | 5/2005 | Aiello et al. |
| 7,095,147 | B2 | | 8/2006 | Aiello et al. |
| 2004/0105601 | A1 | * | 6/2004 | Honda et al. ................. 384/368 |

* cited by examiner

*Primary Examiner*—Thomas R Hannon

(57) ABSTRACT

A fluid bearing that utilizes a variable depth groove is described. The fluid bearing includes two surfaces that are rotatable relative to one another, with a groove on at least one of the surfaces. The floor of the groove is non-constant in depth.

24 Claims, 6 Drawing Sheets

FLUID BEARING WITH A VARIABLE DEPTH GROOVE

TECHNICAL FIELD

The present invention relates to hard disk drives, and in particular to fluid bearings used in hard disk drives.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for writing or reading information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

The spindle assembly includes bearing components—specifically, fluid dynamic bearings—that support rotation of the disk. These fluid dynamic bearings create fluid pressure between the stationary and rotating sections of the spindle assembly. Current fluid dynamic bearing geometries have tradeoffs with respect to performance metrics such as stiffness, damping, stability (the propensity to ingest air), and running torque (power consumption).

SUMMARY

A fluid bearing that utilizes a variable depth groove is described. The fluid bearing includes two surfaces that are rotatable relative to one another, with a groove on at least one of the surfaces. The floor of the groove has a non-constant depth measured from the groove borders.

BEST MODES FOR CARRYING OUT THE INVENTION

Reference will now be made in detail to the alternative embodiments of the present invention; a fluid bearing that utilizes variable depth grooves. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a fluid bearing in conjunction with its operation within a hard disk drive spindle motor and components connected therewith. The discussion will then focus on embodiments of a fluid bearing with variable depth grooves.

Figure 1:
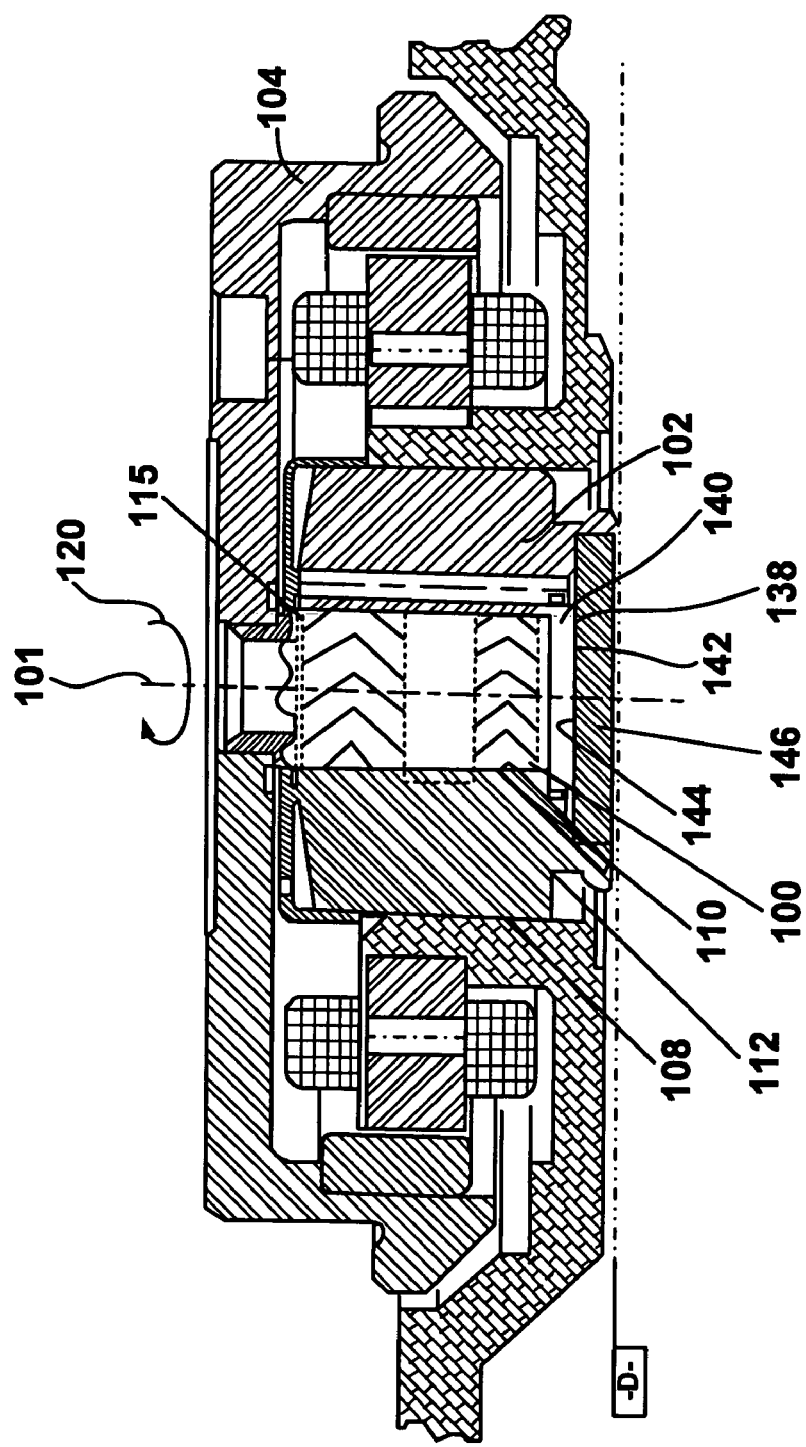
FIG. 1 is a vertical sectional view of a disk drive spindle motor incorporating fluid dynamic bearings according to embodiments of the present invention.

FIG. 1 shows a disk drive spindle motor in which fluid bearing designs of the present invention are useful; however, the present invention is not so limited. That is, the fluid bearings to be described below may be useful in other applications.

FIG. 1 is a vertical sectional view of a shaft 100 rotating within a sleeve 102 and supporting a hub 104 for rotation with the shaft. The hub 104 supports one or more disks for rotation within the disk drive. To provide a stable support between the sleeve 102 and shaft 100, fluid dynamic journal bearings 108 and 110 are provided in the gap 112 between the inner surface of sleeve 102 and the outer surface of shaft 100. An exemplary groove pattern 115 is shown in the two groove bearing regions 108 and 110. The grooves 115 generate hydrodynamic pressure to maintain space between the outer surface of the shaft 100 and the inner surface of the sleeve 102. The grooves 115 may be formed on either or both of the inner and outer surfaces.

In the example of FIG. 1, the grooves are slanted upward and downward relative to the direction of rotation 120, their outer ends are directed forward, and their inner ends are directed rearward relative to the direction of rotation, in order to drive the fluid toward the apex of each of the grooves 115. Dynamic pressure is generated in the gap between the surface of the shaft 100 and the surface of the sleeve 102 due to the relative rotary motion of the shaft and sleeve. As the shaft or sleeve moves in the direction of arrow 120, fluid between the shaft and sleeve flows along each groove. Thus, the grooves 115 both accumulate and retain fluid in the gap between the shaft 100 and the sleeve 102, and pressurize the fluid to increase the bearing load.

The embodiment of FIG. 1 also utilizes a thrust bearing 138 between the plate 140 on the end of shaft 100 or end of shaft 142 and the facing surface 144 of counterplate 146. Grooves may be formed on either surface of the thrust bearing, pumping fluid along the grooves toward the center axis 101. The rotational action of the grooves both accumulates fluid in the grooves and maintains fluid in the gap, and generates the necessary pressure to boost the shaft and surface 142 above the facing surface of the counterplate to allow for free relative rotation without frictional contact.

The grooves on the thrust bearing 138 can also be shaped in accordance with the principals of the present invention in order to enhance the stiffness, damping and stability characteristics of the bearing while not increasing running torque.

The groove shapes of the present invention may be advantageously employed on the bearing surfaces of fluid bearings shown in the following figures; however, the invention is not limited to these motor designs. In a journal bearing, grooves may be formed on the outer surface of the shaft, the inner surface of the sleeve or part of each surface. Grooves also may be used on thrust bearing surfaces, either on the thrust plate or counter plate; or on either surface of a conical or spherical bearing. The figures that follow illustrate a number of exemplary groove shapes according to embodiments of the present invention.

Figure 2:
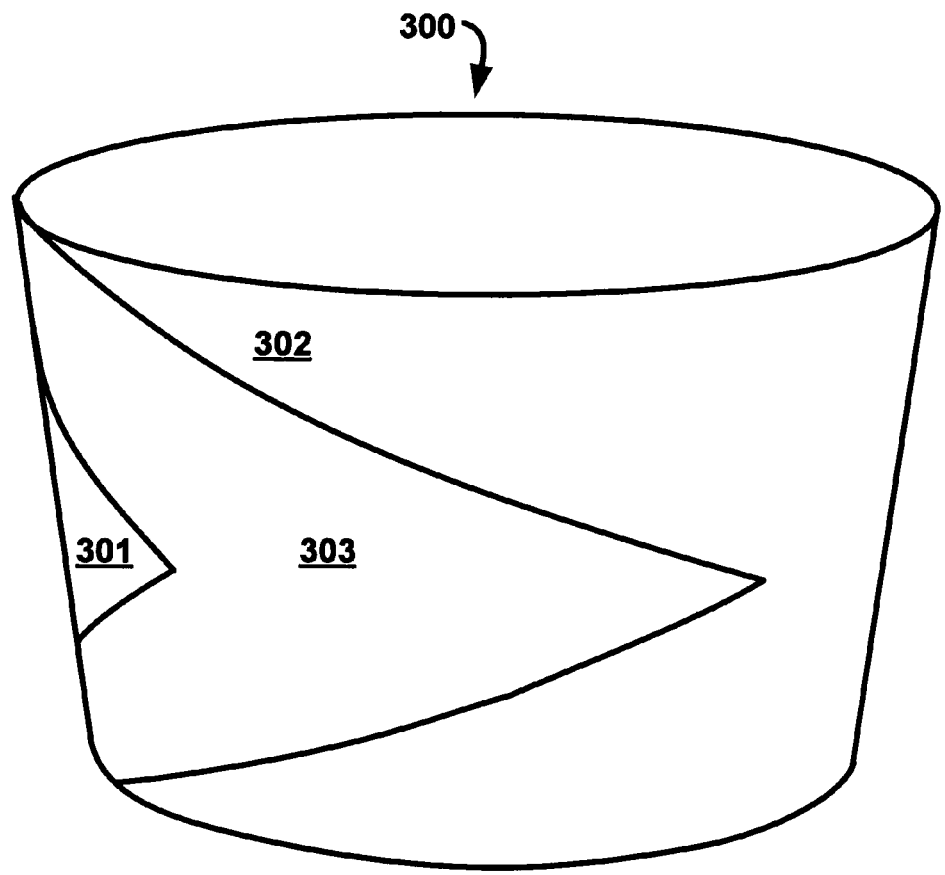
FIG. 2 is a view of an exemplary fluid bearing with a groove, in accordance with one embodiment of the present invention.

With reference to FIG. 2, a view of a fluid bearing 300 with an exemplary groove 303 is illustrated. FIG. 2 illustrates a single groove; however, there may be more than one groove. In the present embodiment, the groove borders 301 and 302 can be represented as linear, continuous line segments that separate the groove 303 from the land of the bearing surface.

Figure 3:
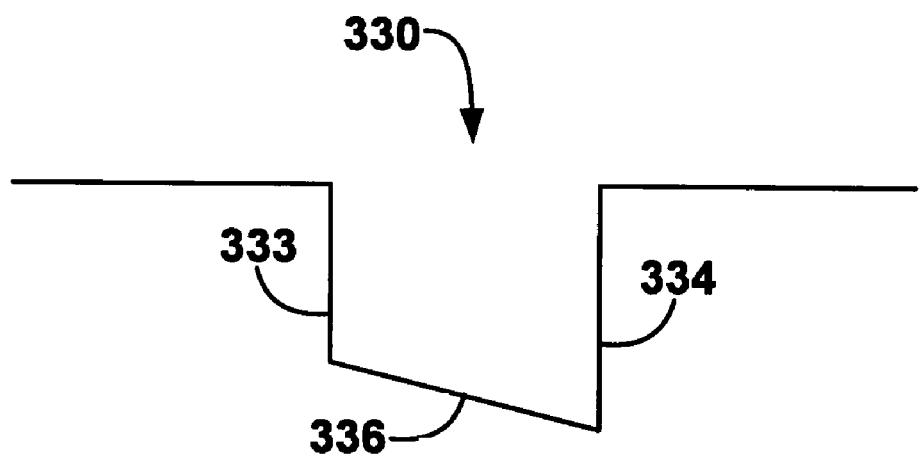
FIG. 3 is a cross-sectional view of an exemplary variable depth groove with a groove floor that is linear and continuous, in accordance with one embodiment of the present invention.

With reference to FIG. 3, a cross-sectional view of an exemplary variable depth groove 330 with a floor 336 that is linear and continuous is illustrated. In the present embodiment, the groove floor 336 can be represented as a linear, continuous line between each of the groove walls 333 and 334. The depth of the groove 330 is non-constant. In other words, the groove walls 333 and 334 are not of the same length.

Figure 4:
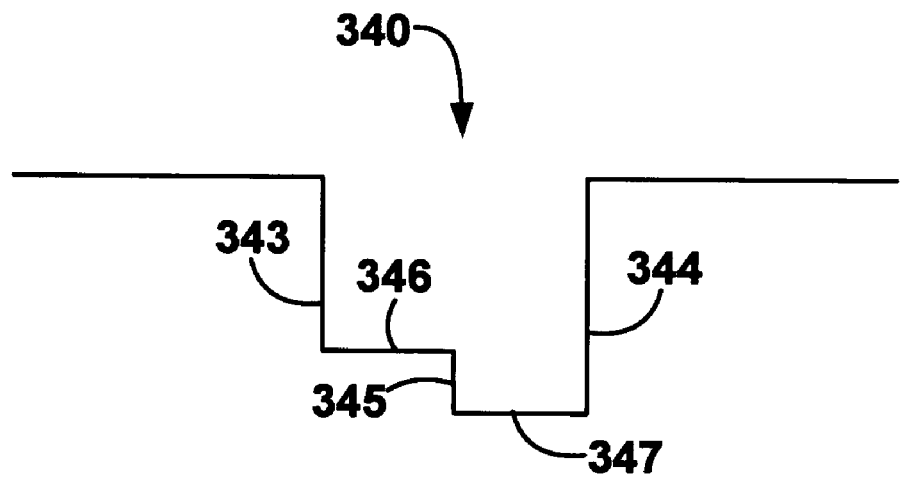
FIG. 4 is a cross-sectional view of an exemplary variable depth groove with a groove floor that is linear and discontinuous, in accordance with one embodiment of the present invention.

With reference to FIG. 4, a cross-sectional view of an exemplary variable depth groove 340 with a floor 345, 346, 347 that is linear and discontinuous is illustrated. In the present embodiment, the groove floor 345, 346 and 347 between each of the groove walls 343 and 344 consists of a number of linear segments that in totality are discontinuous. The depth of the groove 340 is non-constant. In other words, the groove walls 333 and 334 are not of the same length.

Figure 5:
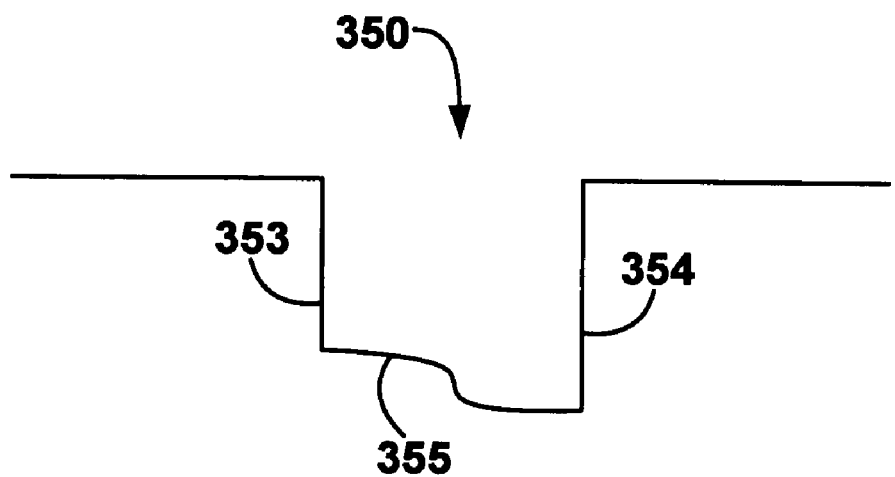
FIG. 5 is a cross-sectional view of an exemplary variable depth groove with a groove floor that is non-linear and continuous, in accordance with one embodiment of the present invention.

With reference to FIG. 5, a cross-sectional view of an exemplary variable depth groove 350 with a floor 355 that is non-linear and continuous is illustrated. In the present embodiment, the groove floor 355 is a non-linear, continuous line between each of the groove walls 353 and 354. The depth of the groove 350 is non-constant. In other words, the groove walls 353 and 354 are not of the same length.

Figure 6:
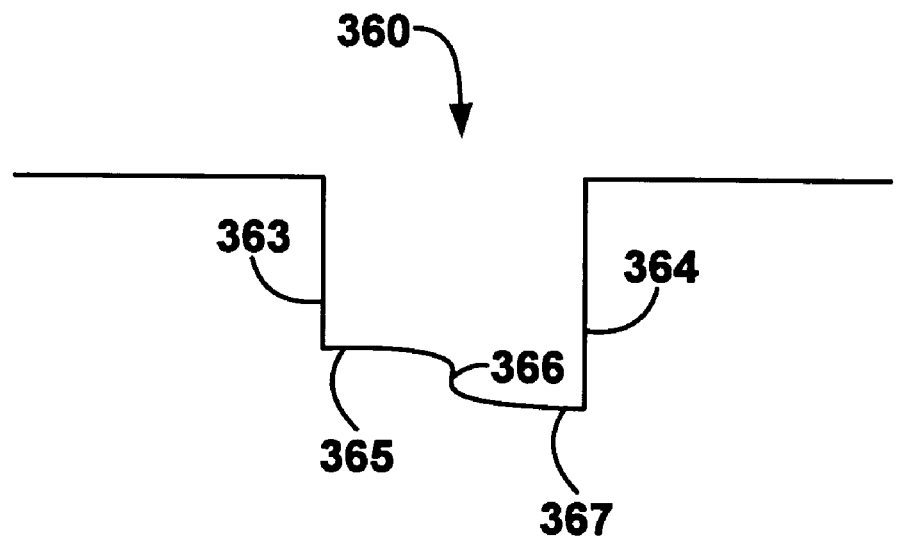
FIG. 6 is a cross-sectional view of an exemplary variable depth groove with a groove floor that is non-linear and discontinuous, in accordance with one embodiment of the present invention.

With reference to FIG. 6, a cross-sectional view of an exemplary variable depth groove 360 with a floor that is non-linear and discontinuous is illustrated. In the present embodiment, the groove floor includes a linear segment 366 and non-linear segments 365 and 367. The depth of the groove 360 is non-constant. In other words, the groove walls 363 and 364 are not of the same length.

While the embodiments illustrated in FIGS. 2-6 show specific instances of groove shapes, the present invention is suitable to alternative shapes. Likewise, different combinations of shapes can be used depending upon the application. That is, for example, a fluid bearing may incorporate grooves all of the same shape, or some combination of the various general shapes described above.

Modeling simulation results based on the use of fluid bearings according to the embodiments of the present invention demonstrate that changing groove shape to change performance characteristics such as stiffness, damping, and stability does not proportionally change running torque. In other words, stiffness, damping and stability metrics can be positively changed without a commensurate negative effect on running torque. More specifically, a groove shape can be selected that increases stiffness and damping, for example, but decreases torque (and thus decreases power consumption).

Furthermore, the different groove shapes may affect the aforementioned performance characteristics by different amounts. Thus, as mentioned above, a groove shape can be selected depending upon the specific requirements of the intended application. In other words, a groove shape can be selected that provides a desired balance between the various performance characteristics.

Embodiments of the present invention, a fluid bearing that utilizes a variable depth groove to increase design flexibility of performance characteristics, are thus described. While the present invention has been described in particular embodiments, it should be appreciated that the present invention should not be construed as limited by such embodiments, but rather construed according to the below claims.

What is claimed is:

1. A fluid dynamic bearing comprising:
   a shaft surface and a sleeve surface, wherein one of said shaft and sleeve surfaces is rotatable relative to the other of said shaft and sleeve surfaces;
   a first groove formed in said shaft surface, wherein said first groove comprises a floor, such that a depth of said first groove floor is non-constant;
   a second groove formed in said sleeve surface, wherein said second groove comprises a floor, such that a depth of said second groove floor is non-constant;
   a third groove formed in a thrust plate; and
   a liquid lubricating medium between said shaft surface and said sleeve surface.

2. The fluid dynamic bearing of claim 1, wherein said first groove formed in said shaft surface is disposed on a shaft within a sleeve on which said sleeve surface is disposed.

3. The fluid dynamic bearing of claim 1, wherein said second groove formed in said sleeve surface is disposed on a sleeve that encircles a shaft on which said shaft surface is disposed.

4. The fluid dynamic bearing of claim 1 further comprising a fourth groove formed in a counter plate.

5. The fluid dynamic bearing of claim 1, wherein the first groove floor is linear, continuous lines.

6. The fluid dynamic bearing of claim 1, wherein the first groove floor is linear, discontinuous lines.

7. The fluid dynamic bearing of claim 1, wherein the first groove floor is non-linear, continuous lines.

8. The fluid dynamic bearing of claim 1, wherein the first groove floor is non-linear, discontinuous lines.

9. A hard disk drive comprising:
   a housing;
   a disk pack having a plurality of disks that are rotatable relative to the housing;
   a fluid dynamic bearing mounted to the housing, wherein said fluid dynamic bearing comprising:

a shaft surface and a sleeve surface, wherein one of said shaft and sleeve surfaces is rotatable relative to the other of said shaft and sleeve surfaces;

a first groove formed in said shaft surface, wherein said first groove comprises a floor, such that a depth of said first groove floor is non-constant;

a second groove formed in said sleeve surface, wherein said second groove comprises a floor, such that a depth of said second groove floor is non-constant;

a third groove formed in a thrust plate; and a liquid lubricating medium between said shaft surface and said sleeve surface.

10. The hard disk drive of claim 9, wherein said first groove formed in said shaft surface is disposed on a shaft within a sleeve on which said sleeve surface is disposed.

11. The hard disk drive of claim 9, wherein said second groove formed in said sleeve surface is disposed on a sleeve that encircles a shaft on which said shaft surface is disposed.

12. The hard disk drive of claim 9 further comprising a fourth groove formed in a counter plate.

13. The hard disk drive of claim 9, wherein the first groove floor is linear, continuous lines.

14. The hard disk drive of claim 9, wherein the first groove floor is linear, discontinuous lines.

15. The hard disk drive of claim 9, wherein the first groove floor is non-linear, continuous lines.

16. The hard disk drive of claim 9, wherein the first groove floor is non-linear, discontinuous lines.

17. A fluid dynamic bearing having variable depth grooves, comprising:

a shaft surface and a sleeve surface, wherein one of said shaft and sleeve surfaces is rotatable relative to the other of said shaft and sleeve surfaces;

a first groove on one of said shaft surface or said sleeve surface and a second groove on the other of said shaft and sleeve surfaces, wherein said first groove comprises a floor such that a depth of said first groove floor is non-constant and wherein said second groove comprises a floor, such that said second groove floor depth is non-constant;

a third groove formed in a thrust plate; and a liquid lubricating medium between said shaft surface and said sleeve surface.

18. The fluid dynamic bearing of claim 17, wherein said first groove formed in said shaft surface is disposed on a shaft within a sleeve on which said sleeve surface is disposed.

19. The fluid dynamic bearing of claim 18, wherein the first groove floor is linear, continuous lines.

20. The fluid dynamic bearing of claim 18, wherein the first groove floor is linear, discontinuous lines.

21. The fluid dynamic bearing of claim 18, wherein the first groove floor is non-linear, continuous lines.

22. The fluid dynamic bearing of claim 18, wherein the first groove floor is non-linear, discontinuous lines.

23. The fluid dynamic bearing of claim 17, wherein said second groove formed in said sleeve surface is disposed on a sleeve that encircles a shaft on which said shaft surface is disposed.

24. The fluid dynamic bearing of claim 17 further comprising a fourth groove formed in a counter plate.

* * * * *